Jan. 15, 1924.　　　　　　　　　　　　　　1,481,010
C. F. HOPEWELL
WINDSHIELD VISOR
Filed April 7, 1921　　　　　2 Sheets-Sheet 1
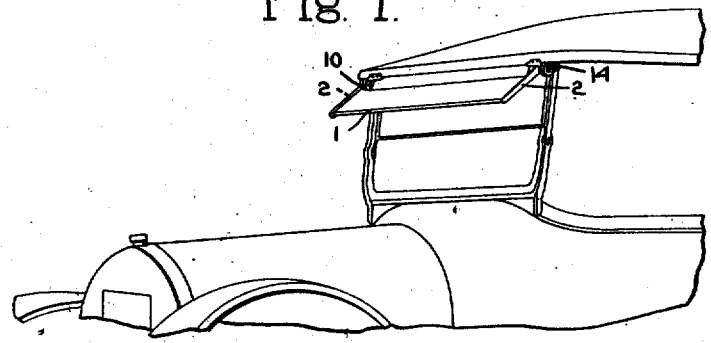
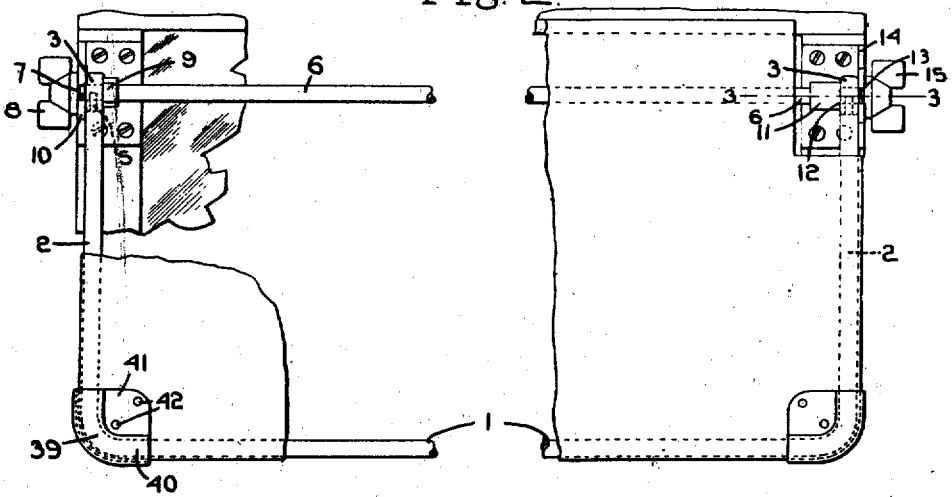
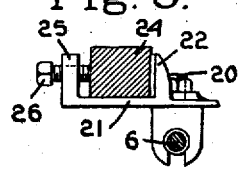
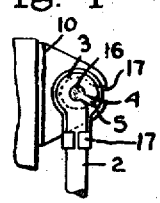
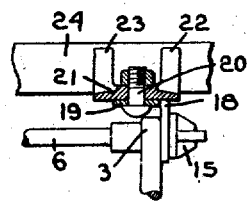
Inventor.
Charles F. Hopewell
by Heard Smith & Tennant.
Attys.

Jan. 15, 1924.                                          1,481,010
                    C. F. HOPEWELL
                   WINDSHIELD VISOR
              Filed April 7, 1921           2 Sheets-Sheet 2
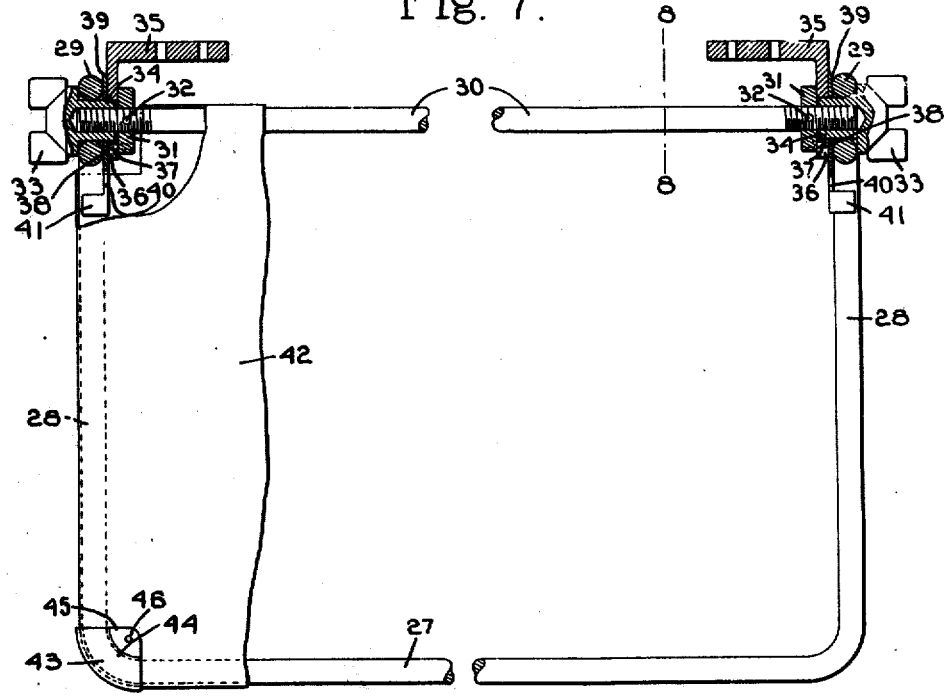
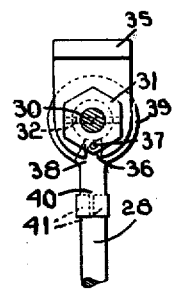
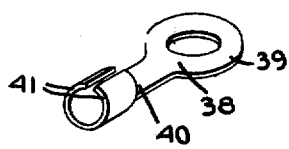
Inventor.
Charles F. Hopewell
by Heard Smith & Tennant.
                    Attys.

Patented Jan. 15, 1924.

1,481,010

UNITED STATES PATENT OFFICE.

CHARLES F. HOPEWELL, OF WATERTOWN, MASSACHUSETTS, ASSIGNOR TO HOPEWELL BROTHERS, OF WATERTOWN, MASSACHUSETTS.

WINDSHIELD VISOR.

Application filed April 7, 1921. Serial No. 459,213.

*To all whom it may concern:*

Be it known that I, CHARLES F. HOPEWELL, a citizen of the United States, and resident of Watertown, county of Middlesex, State of Massachusetts, have invented an Improvement in Windshield Visors, of which the following description, in connection with the accompanying drawing, is a specification, like characters on the drawing representing like parts.

This invention relates to improvements in wind-shield visors and other devices comprising a frame which is pivoted upon a suitable support and provided with means for securing the frame in different positions of angular adjustment.

In usual constructions of this character the frame is provided with pivots which extend through brackets and are provided with fixed clamps which, when tightened, secure the frame in adjusted position. In such a construction a strain is imposed upon the bracket which is likely to loosen it. Furthermore, such clamps are insufficient in maintaining the frame in properly adjusted position.

One of the objects of the present invention is to provide a novel clamping means for a wind-shield visor or similar device which will not impose any lateral strain upon the bracket and which will not necessitate accurate positioning of the bracket.

A further object of the invention is to provide a construction which can be readily assembled and removed.

Another object of the invention is to provide a wind-shield visor or like device with supporting brackets which can be adjusted rotarily to enable the bracket to be attached to a supporting member located in different positions relatively to the axis of the supporting member of the frame.

A further object of the invention is to provide an increased frictional area between the side members of the wind-shield visor or frame and the co-operating clamping members which will permit the visor to be secured rigidly in adjusted positions.

A further object of the invention is to provide a wind-shield visor which can be manufactured at relatively low cost.

Other objects and features of the invention will more fully appear from the following description and the annexed drawings and will be pointed out in the accompanying claims.

A preferred embodiment of my invention is illustrated herein as applied to the windshield visor of an automobile, but it will be understood that the invention may be employed in connection with other types of devices to which it may be applicable.

In the drawings:

Fig. 1 is a perspective view of the front portion of an automobile showing a windshield visor embodying my invention applied thereto;

Fig. 2 is a front elevation illustrating the windshield visor embodying my invention applied to a closed car;

Fig. 3 is a detail sectional view on line 3—3 Fig. 2, the clamping nut being shown in elevation;

Fig. 4 is a detail view showing one of the brackets secured to a supporting member and illustrating the end portion of one of the side frames, the supporting bar being shown in section, and also illustrating a frictional member attached to said frame ends presenting a relatively large frictional area for engagement by the co-operating clamping means;

Fig. 5 is a view showing the novel form of supporting bracket which is pivotally supported upon a base having means for clamping the same to a supporting member;

Fig. 6 is a view of the construction illustrated in Fig. 5 viewed from the right toward the left, a portion of the bracket and its base being shown in section;

Fig. 7 is an end elevation, partly in section, of a modified form of wind-shield visor and supporting brackets, and, Fig. 8 is a detail view on line 8—8 Fig. 7 viewed from the left toward the right.

Fig. 9 is a perspective view of a frictional member adapted to be secured to the end portions of the side frame to present increased frictional clamping area.

The invention is disclosed herein as embodied in the wind-shield visor mechanism of an automobile. It comprises a frame consisting of a front member 1 and side members 2, preferably integral therewith, having their free ends bent to form eyes 3, the end portions of the side members being spaced apart from the adjacent portion of the side members to provide slots 4 adapted to receive a pin 5 or other device projecting laterally from the rear or supporting member 6 of the frame. The supporting member 6, in the preferred construction illustrated in Fig. 2, is provided at one end with a screw threaded section 7 which is engaged by a preferably winged clamping nut 8 and a co-operating clamping collar or nut 9 which is preferably adjustably mounted upon the supporting member 6. This end of the supporting member is journalled in the outwardly projecting member of a bracket 10 which is suitably secured to the frame of the automobile.

In order to prevent lateral strain upon the bracket the supporting member desirably is made extensible. As illustrated herein the opposite end of the supporting member 6 is telescopically mounted in a sleeve 11 having a shouldered end 12 and a screw threaded extension 13 adapted to pass through a suitable journal in a bracket 14. A preferably winged clamping nut 15 engages the screw threaded extension 13 and is provided with a hub 16 which fits the journal in the bracket 14. The bracket desirably is provided with a slot narrower than the diameter of the journal, but of sufficient width to permit the extension 13 to be introduced into the journal of the bracket.

In order to provide an increased clamping surface the eye portions of the side frames may be provided with flattened sides, or if round in cross section may have frictional members 17 (see Fig. 4) secured to them as will hereinafter be more fully described.

By reason of this construction the supporting rod of the frame may be readily assembled upon the brackets and the necessity for positioning the brackets with great accuracy is obviated. By reason of the extensibility of the supporting member of the frame the projection or projections 5, which extend from the supporting member 6 into the slot or slots 4, prevent relative rotary movement between the side members and the supporting member, so that the frame may be clamped and supported in any desirable position.

A further feature of the invention comprises the provision of a bracket having a base, preferably provided with clamping means adapted to attach the same to a supporting member, whether the same is in parallelism with the axis of the supporting member of the frame or in angular relation thereto.

A preferred construction is disclosed in Figs. 5 and 6 in which a bracket 18, substantially similar in construction to the brackets above described and having a suitable journal to receive the supporting member 6 of the frame, is illustrated. The portion 19 of the bracket, however, which extends in parallelism with the axis of the supporting member, is pivotally connected by a bolt 20 or other suitable fastening to a base member 21 which may be a flat plate, but preferably is provided with upwardly extending bosses 22, 23 adapted to engage one side of a supporting member 24 and an extension or boss 25 in parallelism with the bosses 22, 23 having mounted therein a set screw 26 adapted to clamp against the opposite side of the supporting member 24 from that which is engaged by the bosses 22 and 23. By reason of this construction the base of the bracket may be applied to a supporting member which extends in any angular relation relatively to the axis of the supporting member 6.

A modified form of the invention is illustrated in Fig. 7 in which the frame comprises a front bar 27 and side members 28 which are bent at their ends to form eyes 29 and a supporting member or rod 30, the ends of which are screw threaded and pass through the eyes 29 in the side members 28.

The supporting member or rod 30 is provided adjacent its ends with adjustable abutments adapted to engage the insides of the supporting brackets. These abutments desirably may be in the form of collars or nuts 31 which, when properly positioned relatively to the position of the brackets previously affixed to a supporting member, may be secured in place by pins 32 passing through said collars into or through said supporting member 30. The screw threaded ends of the supporting member desirably are engaged by winged nuts 33 having hubs 34 extending through the eyes of the side members 28 and also into journals in the brackets 35. The brackets 35 desirably are provided with slots 36 narrower than the diameter of the journals, but of sufficient width to permit the ends of the supporting member 30 to be introduced therethrough when the nuts 33 are backed off sufficiently to remove the hubs 34 from the journals in said brackets.

In order to prevent rotation of the supporting member 30, when the nuts 33 are screwed up or unscrewed, the collar 31 is provided with a laterally extending lug or pin 37 which projects into the slot 36 and by engagement with one of the walls of the slot prevents such rotation. In this construction the front and side members of the frame move pivotally about the hubs of the clamping nuts 33 and when the frame is placed in a desired position the setting up of said nuts clamp the eyes of the side members 28 of the frame firmly against the outer sides of the brackets 35, thereby securing the frame in the desired position.

The end portions of the side frames which form the eyes 29 may be provided with flattened sides to present increased frictional areas to be engaged by the face of the bracket or the co-operating clamping means, or both, as described in respect to the construction illustrated in Figs. 1 to 3. If, however, side frames are employed in which the eye portions are circular in cross section an additional frictional member may be employed. A convenient form of frictional member 38 which is illustrated in Fig. 9 comprises an eye portion 39 presenting flat faces one of which is adapted to be engaged by the bracket or the co-operating clamping means and an extension 40 preferably curved in cross section to fit the side member 28 and having flanges or tabs 41 adapted to be bent to embrace the side member 28 so that the frictional member will be firmly secured to the end of the side frame. The eye in the eye portion 39 is so located as to be in alinement with the eye in the end portion 28 of the side frame. Desirably frictional members of this character may be provided for each of the free ends of the side frames. By reason of this construction a greatly increased frictional area is presented over that which would be provided by the narrow line of contact between the cross sectional round eye portion of the frame and the bracket if such a frictional member were not employed.

Preferably the front and side members of the frame comprise an integral construction and may be made from a straight bar, the ends of which are bent at right angles to the central portion to provide the side members 28, the ends of the side members being again bent to form eyes of the character above described.

In each of the constructions illustrated the frame may be covered by any suitable, preferably waterproofed, material 42 which may be hemmed around the front, side and supporting members of the frame.

The front corners of the frame desirably may be provided with sheet metal clips 43 adapted to embrace the corners of the frame and enclose the covering, the clips being stamped to provide tubular portions 44 to enclose the corners formed by the bends in the frame, and oppositely disposed flat portions 45 adapted to engage the body of the covering and to be secured together and with the covering therebetween by rivets 46 or other suitable fastenings.

It will be observed that the wind shield visor constructions above described may be easily manufactured at a relatively low cost and that such devices are adapted to be readily applied to or assembled upon any usual type of automobile.

It will be understood that the embodiments of the invention disclosed herein are illustrative of preferred forms of my invention, but are not restrictive, and that various changes may be made in construction and arrangement of parts within the spirit and scope of the following claims.

Having thus described my invention, what I claim as new, and desire to secure by Letters Patent, is:

1. A device of the class described comprising a frame having a front bar and side bars, the free ends of the side bars being bent to present eyes, the ends of the eye portions of said side bars being spaced apart from the adjacent portions of said side bars to provide slots, supporting brackets having apertures, a supporting bar having screw threaded outer ends passing through the apertures in said brackets and said eyes, abutments on said supporting bar to engage one side of the bracket, means rigid with said supporting bar located in said slots and nuts upon the screw threaded ends of said supporting rods operable to clamp the side bars against the brackets.

2. A device of the class described comprising a U-shaped frame having a front bar and side bars integral therewith, the free ends of said side bars being provided with eyes, the ends of each eye portion of said side bars being spaced apart from the adjacent portion of the side bars to provide slots, brackets having apertures, a supporting bar having screw threaded ends passing through said brackets and said eyes and presenting shoulders to engage the inner sides of said brackets, pins in said supporting bar engaging said slots and nuts on the screw threaded ends of said supporting bar for clamping said side bars against said brackets.

3. A device of the class described comprising a frame having a front bar and side bars, the free ends of said side bars being bent to present eyes, the ends of said side bars being spaced from the adjacent portions of said side bars, a supporting bar formed in telescoping sections having screw threaded outer ends passing through said eyes, a pin anchored in said supporting bar positioned in the slot in one of said eyes, brackets having journals to receive the ends of said supporting bar and means for clamping said supporting bar to said bracket.

4. A device of the class described comprising a frame having a front bar and side bars rigid therewith, the free ends of said side bars being provided with eyes, a supporting bar having screw threaded ends passing through said eyes, brackets having journals provided with slots to permit the introduction of said supporting bar into said journals, collars fixedly secured to said bars adapted to engage the side of said bracket and having means to engage the slots in said bracket and thereby to prevent rotation of said supporting bar and clamping nuts having hubs fitting said journals adapted when set up to clamp the side bars of said frame against said bracket.

In testimony whereof, I have signed my name to this specification.

CHARLES F. HOPEWELL.